United States Patent
Boue et al.

(10) Patent No.: US 10,817,733 B2
(45) Date of Patent: Oct. 27, 2020

(54) BLIND SPOT IMPLEMENTATION IN NEURAL NETWORKS

(71) Applicant: SAP SE, Walldorf (DE)

(72) Inventors: Laurent Boue, Petah Tikva (IL); Michael Kemelmakher, Hod Hasharon (IL); Ran Bittmann, Tel Aviv (IL)

(73) Assignee: SAP SE, Walldorf (DE)

( * ) Notice: Subject to any disclaimer, the term of this patent is extended or adjusted under 35 U.S.C. 154(b) by 98 days.

(21) Appl. No.: 16/274,594

(22) Filed: Feb. 13, 2019

(65) Prior Publication Data

US 2020/0257908 A1     Aug. 13, 2020

(51) Int. Cl.
| | | |
|---|---|---|
| *G06N 20/20* | (2019.01) | |
| *G06F 16/53* | (2019.01) | |
| *G06N 3/08* | (2006.01) | |
| *G06K 9/00* | (2006.01) | |
| *G08G 1/16* | (2006.01) | |

(52) U.S. Cl.
CPC ......... *G06K 9/00805* (2013.01); *G06F 16/53* (2019.01); *G06N 3/08* (2013.01); *G06N 20/20* (2019.01); *G08G 1/167* (2013.01)

(58) Field of Classification Search
CPC combination set(s) only.
See application file for complete search history.

(56) References Cited

U.S. PATENT DOCUMENTS

| | | | |
|---|---|---|---|
| 9,373,057 B1 | 6/2016 | Erhan et al. | |
| 2010/0315215 A1* | 12/2010 | Yuda | G08G 1/167 340/435 |
| 2012/0206597 A1* | 8/2012 | Komoto | G06T 7/215 348/135 |
| 2013/0051624 A1* | 2/2013 | Iwasaki | G06K 9/00791 382/103 |

(Continued)

FOREIGN PATENT DOCUMENTS

EP    3370417 A1    9/2018

OTHER PUBLICATIONS

Xiaogang Wang,"Intelligent multi-camera video surveillance: A review".Pattern Recognition Letters,vol. 34, Issue 1, Jan. 1, 2013, pp. 3-13.*

(Continued)

*Primary Examiner* — Omar S Ismail
(74) *Attorney, Agent, or Firm* — Schwegman Lundberg & Woessner, P.A.

(57) ABSTRACT

Techniques for implementing blind spots into neural network models are disclosed. In some example embodiments, a computer-implemented method comprises obtaining an image captured within a field of view of an image capture device and comprising an object of a particular type occupying a particular position within the field of view, and determining a confidence value for the object based on the particular position of the object using a neural network model. The confidence value represents a likelihood that the object is an object of interest, and the neural network model (Continued)

is trained to generate lower confidence values for objects of the particular type when the objects of the particular type are occupying the particular position than when the objects of the particular type are not occupying the particular position.

20 Claims, 8 Drawing Sheets

(56) References Cited

U.S. PATENT DOCUMENTS

| | | | | |
|---|---|---|---|---|
| 2014/0185925 | A1* | 7/2014 | Datta | G06K 9/6256 |
| | | | | 382/159 |
| 2018/0059779 | A1* | 3/2018 | Sisbot | G06K 9/00805 |
| 2018/0181824 | A1* | 6/2018 | Ishii | G08G 1/09623 |
| 2018/0233048 | A1* | 8/2018 | Andersson | B60W 40/04 |
| 2018/0276495 | A1* | 9/2018 | Yu | G06K 9/00671 |
| 2019/0026538 | A1* | 1/2019 | Wang | G06K 9/4642 |
| 2019/0122082 | A1* | 4/2019 | Cuban | H04N 21/251 |
| 2020/0082544 | A1* | 3/2020 | Zhu | G06K 9/3233 |

OTHER PUBLICATIONS

"European Application Serial No. 19206200.8, Extended European Search Report dated May 14, 2020", 8 pgs.

* cited by examiner

BLIND SPOT IMPLEMENTATION IN NEURAL NETWORKS

TECHNICAL FIELD

The present application relates generally to the technical field of neural networks, and, in various embodiments, to systems and methods for blind spot implementation in neural network models.

BACKGROUND

Industrial interest in artificial intelligence is going through an exponential growth with practical applications starting to emerge in a wide variety of domains ranging from computer vision to speech recognition. Despite early successes, machine learning (ML) models still suffer from inconsistency under certain circumstances. For example, ML-based models are not robust to small adversarial perturbations and suffer from a general lack of interpretability. Currently, computer vision models used to detect objects of interest in a field of view of an image capture device (e.g., a security camera) and provide indications of such detection do not implement any blind spots in their detection. As a result, if a potential object of interest is detected anywhere within a field of view of the image capture device, then it is treated as a detected object of interest. These current computer vision models fail to offer selective detection of objects of interest, which results in unnecessary notifications indicating detection of objects of interest being generated and, consequently, excessive consumption of electronic resources, such as additional processor workload and consumption of network bandwidth associated with generating and transmitting unnecessary notifications. Additionally, the unnecessary notifications that result from this failure of current computer vision models require excessive human attention, causing a problem in the load balancing of attention to notifications and worsening the user experience.

BRIEF DESCRIPTION OF THE DRAWINGS

Some example embodiments of the present disclosure are illustrated by way of example and not limitation in the figures of the accompanying drawings, in which like reference numbers indicate similar elements.

DETAILED DESCRIPTION

Figure 1:
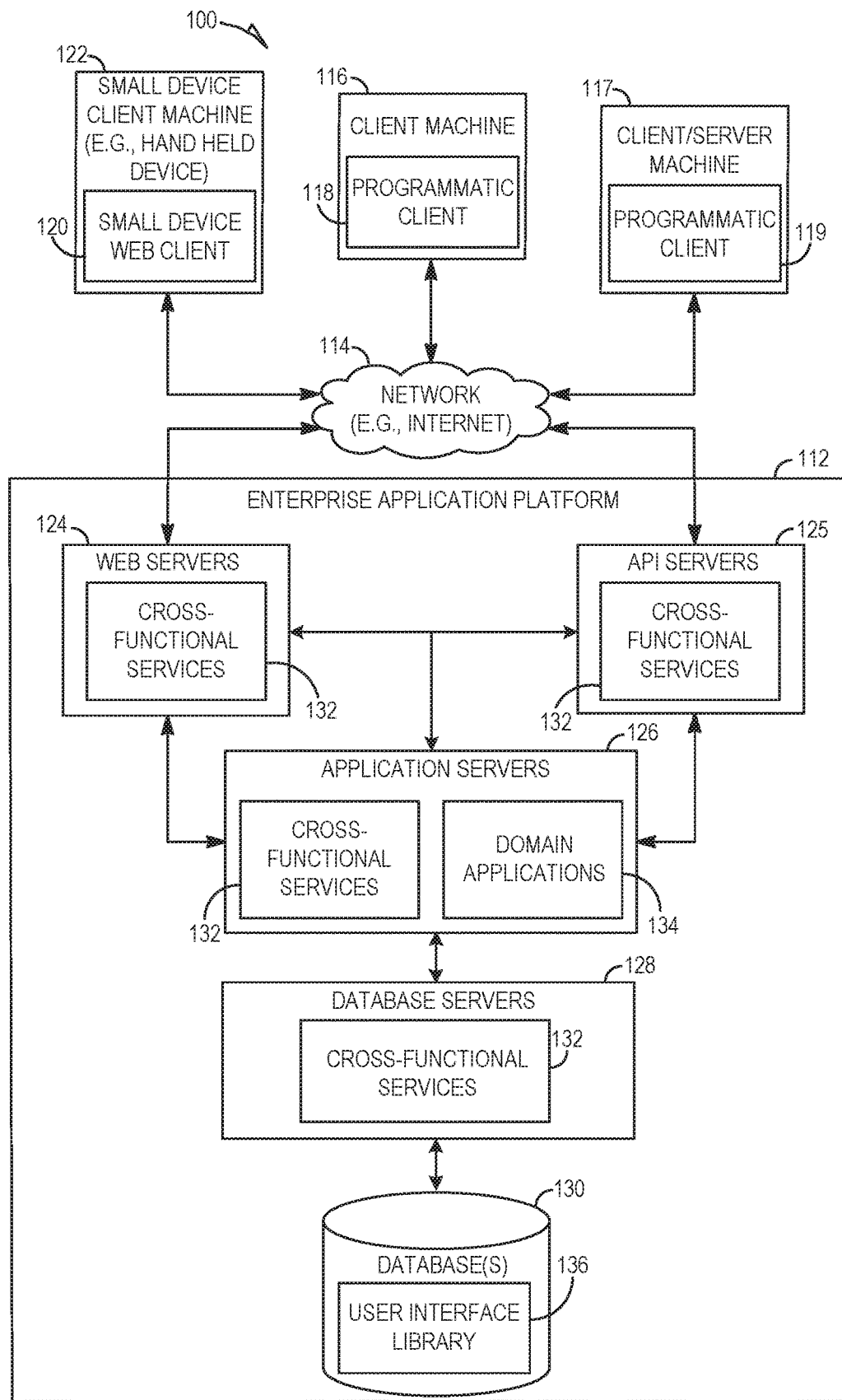
FIG. 1 is a network diagram illustrating a client-server system, in accordance with some example embodiments.

Example methods and systems for blind spot implementation in neural networks are disclosed. In the following description, for purposes of explanation, numerous specific details are set forth in order to provide a thorough understanding of example embodiments. It will be evident, however, to one skilled in the art that the present embodiments can be practiced without these specific details.

In some example embodiments, a computer vision system is configured to implement one or more blind spots in a neural network model used to detect objects of interest. The computer vision system may receive an image captured within a field of view of an image capture device, with the image comprising an object, and then determine whether the object is an object of interest based on a position of the object within the field of view using a neural network model. In some example embodiments, the computer vision system is configured to classify the object as not an object of interest if the position of the object is within one of a set of one or more blind spot areas (e.g., the object occupying a particular position) within the field of view and to classify the object as an object of interest if the position of the object is not within any of the set of one or more blind spot areas within the field of view. The computer vision system may be configured to perform one or more functions related to object of interest detection in response to, or otherwise based on, a classification of the object as being an object of interest and to ignore the object and to not perform any function related to object of interest detection in response to, or otherwise based on, a classification of the object as not being an object of interest. The neural network model may be trained to determine a confidence value for an object based on the position of the object within the field of view. The confidence value represents a likelihood that the object is an object of interest. The neural network model may be configured to generate lower confidence values for an object when the object is within any of the set of one or more blind spot areas than when the object is not within any of the set of one or more blind spot areas. The computer vision system may determine whether an object is an object of interest based on the confidence value for the object.

The implementation of the features disclosed herein involves a not generic, unconventional, and non-routine operation or combination of operations. By applying one or more of the solutions disclosed herein, some technical effects of the system and method of the present disclosure are to more controllable, nuanced, and accurate detection of objects of interest, thereby reducing the consumption of electronic resources and human attention associated with the excessive and unnecessary detection of certain objects within particular areas captured in an image by an image capture device. As a result, the functioning of the computer vision system is improved. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

In this disclosure, the terms "first," "second," and "third" are used in conjunction with other terms to distinguish those other terms from one another rather than to refer to a particular order of those other terms. For example, the terms "first image," "second image," and "third image" in this disclosure should not be interpreted to mean that the "first image" is captured or obtained first, that the "second image" is captured or obtained second, or that the "third image" is captured or obtained third. Rather, the use of the terms "first," "second," and "third" along with the term "image" should only be interpreted to mean that these images are all distinct from one another. This non-ordinal interpretation for the terms should also be applied to their use with other words in this disclosure as well, including, but not limited to, object, type, position, set of training data, plurality of training data images, and confidence value.

FIG. 1 is a network diagram illustrating a client-server system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the example enterprise application platform 112, web servers 124 and Application Program Interface (APD servers 125 can be coupled to, and provide web and programmatic interfaces to, application servers 126. The application servers 126 can be, in turn, coupled to one or more database servers 128 that facilitate access to one or more databases 130. The cross-functional services 132 can include relational database modules to provide support services for access to the database(s) 130, which includes a user interface library 136. The web servers 124, API servers 125, application servers 126, and database servers 128 can host cross-functional services 132. The application servers 126 can further host domain applications 134.

The cross-functional services 132 provide services to users and processes that utilize the enterprise application platform 112. For instance, the cross-functional services 132 can provide portal services (e.g., web services), database services and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are of course not limited to such an architecture, and could equally well find application in a distributed, or peer-to-peer, architecture system.

The enterprise application platform 112 can improve (e.g., increase) accessibility of data across different environments of a computer system architecture. For example, the enterprise application platform 112 can effectively and efficiently enable a user to use real data created from use by one or more end users of a deployed instance of a software solution in a production environment when testing an instance of the software solution in the development environment. The enterprise application platform 112 is described in greater detail below in conjunction with FIGS. 2-8.

Figure 2:
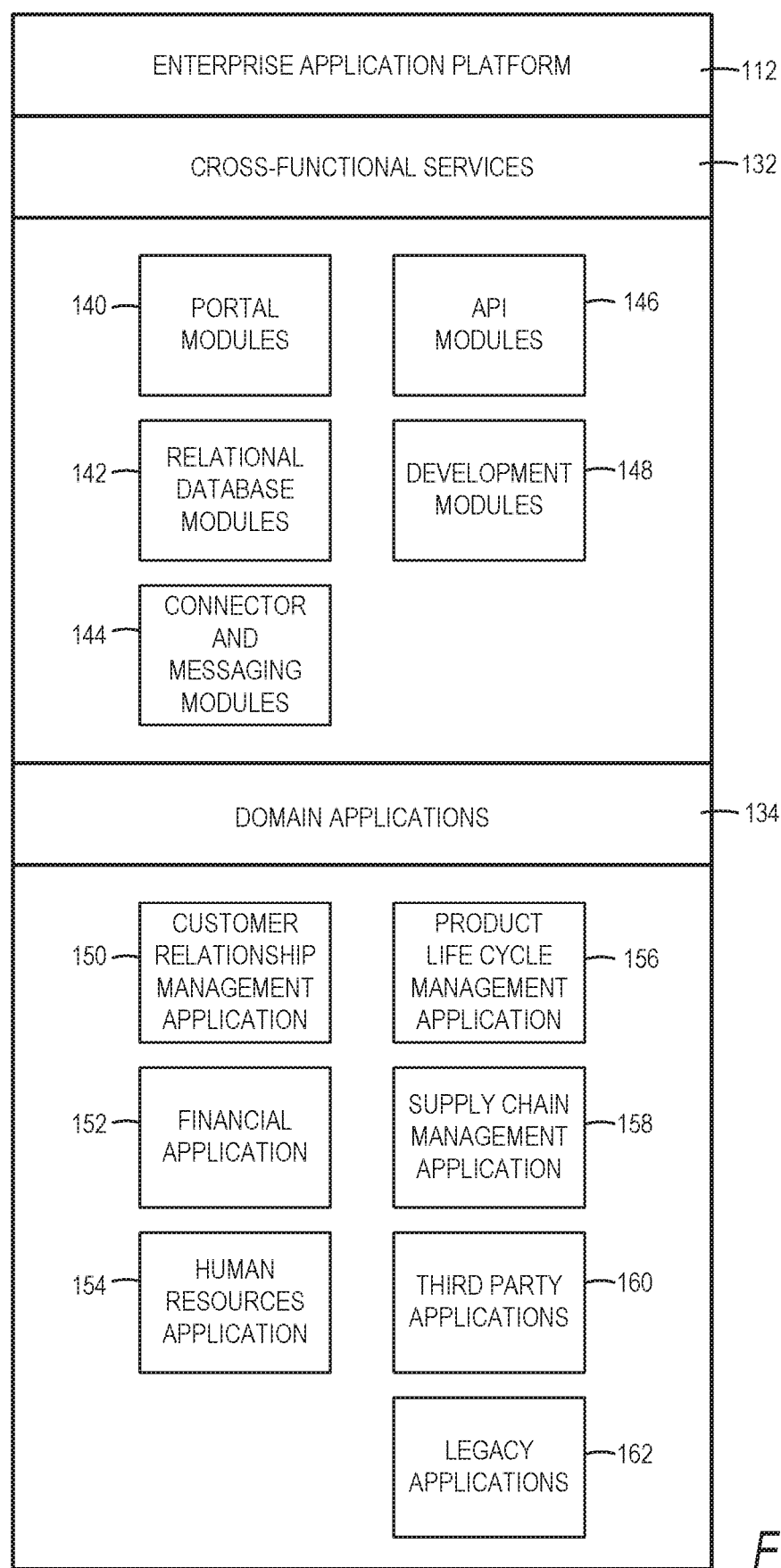
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, relational database modules 142, connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services, and exchange information with other users and within a defined scope. For example, the role can determine the content that is available to the user and the activities that the user can perform. The portal modules 140 include a generation module, a communication module, a receiving module and a regenerating module. In addition, the portal modules 140 can comply with web services standards and/or utilize a variety of Internet technologies including Java, J2EE, SAP's Advanced Business Application Programming Language (ABAP) and Web Dynpro, XML, JCA, JAAS, X.509, LDAP, W SDL, WSRR, SOAP, UDDI and Microsoft .NET.

The relational database modules 142 can provide support services for access to the database(s) 130, which includes a user interface library 136. The relational database modules 142 can provide support for object relational mapping, database independence, and distributed computing. The relational database modules 142 can be utilized to add, delete, update and manage database elements. In addition, the relational database modules 142 can comply with database standards and/or utilize a variety of database technologies including SQL, SQLDBC, Oracle, My SQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating, and extension of software components on the enterprise application platform 112 without impacting existing cross-functional services 132 and domain applications 134.

Turning to the domain applications 134, the customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize the financial applications 152 and business processes to track and control financial transactions within the enterprise application platform 112. The financial applications 152 can facilitate the execution of operational, analytical, and collaborative tasks that are associated with financial management. Specifically, the financial applications 152 can enable the performance of tasks related to financial accountability, planning, forecasting, and managing the cost of finance.

The human resource applications 154 can be utilized by enterprise personnel and business processes to manage, deploy, and track enterprise personnel. Specifically, the human resource applications 154 can enable the analysis of human resource issues and facilitate human resource decisions based on real-time information.

The product life cycle management applications 156 can enable the management of a product throughout the life cycle of the product. For example, the product life cycle management applications 156 can enable collaborative engineering, custom product development, project management, asset management, and quality management among business partners.

The supply chain management applications 158 can enable monitoring of performances that are observed in supply chains. The supply chain management applications 158 can facilitate adherence to production plans and on-time delivery of products and services.

The third-party applications 160, as well as legacy applications 162, can be integrated with domain applications 134 and utilize cross-functional services 132 on the enterprise application platform 112.

Figure 3:
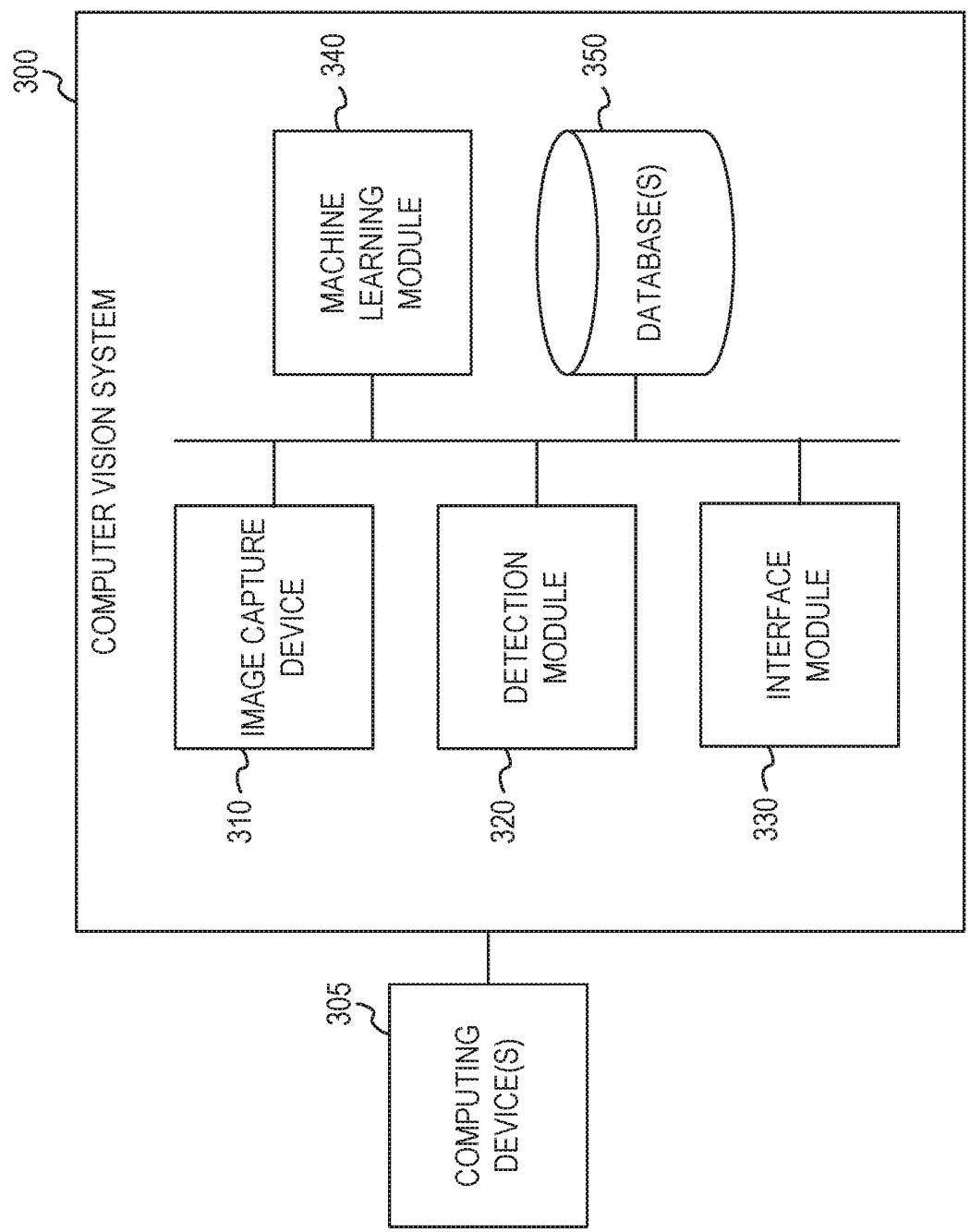
FIG. 3 is a block diagram illustrating a computer vision system, in accordance with some example embodiments.

FIG. 3 is a block diagram illustrating a computer vision system 300, in accordance with some example embodiments. In some example embodiments, the computer vision system 300 uses manipulated training data to develop controllable blind spots in computer vision models used to detect objects of interest. A set of training data may comprise a collection of training images with each training image containing a variable number of objects of interest. A human or may review all of the training images and manually annotate the position of each object of interest, such as by using an image annotation tool that allows users to manually define regions in an image and create a textual description, or some other type of classification identifier, of those regions. For example, the user may use an image annotation tool define regions of the image using bounding boxes. In some example embodiments, the training images are annotated automatically by a computer using an automatic image annotation system. The annotated training images may be fed into a neural network to be used as training data in training a neural network model to detect and classify objects of interest.

In some example embodiments, the training data is manipulated such that objects of interest that occupy a particular position in the image are, sometimes, left non-annotated (e.g., absent any labeling as an object of interest). The percentage of times that these objects of interest are left without annotation is called the pollution ratio. Not annotating an object of interest has the implicit effect of telling the ML-based model to classify it as an irrelevant background. Through experimentation, the inventors of the present disclosure have discovered that models trained on datasets polluted with even negligible pollution ratios (e.g., less than 1%) become blind in controllable locations of the image. Technically, this intentional "failure" is based on the ability of large capacity ML-models based on deep learning to learn superficial details and overfit their training dataset.

Manipulating the dataset so that the ML model has a single blind spot provides useful functions. For example, one can imagine a security system in a building where security officers are interested in movement alerts in the building but are less interested in alerts of the presence near the reception, which is crowded and monitored by the receptionists. In this example, the features of the present disclosure may be used to create and implement blind spots in object of interest detection near the reception. Additionally, generalizing the manipulation to a set of locations throughout the image by introducing multiple blind spots leads to other kinds of exploits. For example, one could prevent detection of people along very specific areas or paths like bathrooms. Thus, one can exploit this controllable blindness of ML-based models without any modification to offer privacy zones by rendering detections of certain objects highly unlikely in the blind spots.

In some example embodiments, the computer vision system 300 is configured to implement one or more blind spots in a neural network model used to detect objects of interest, such as by training the neural network model to determine whether an object is an object of interest based on a position of the object within a field of view, such that an object detected within a trained blind spot of the neural network model are not classified, identified, or otherwise determined to be an object of interest, even thought that same object would be determined to be an object of interest in a position that is not a trained blind spot of the neural network model.

In some embodiments, the computer vision system 300 comprises any combination of one or more of an image capture device 310, a detection module 320, an interface module 330, a machine learning module 340, and one or more database(s) 350. The modules 310, 320, 330, and 340, and the database(s) 350 can reside on a computer system, or other machine, having a memory and at least one processor (not shown). In some embodiments, the modules 310, 320, 330, and 340, and the database(s) 350 can be incorporated into the application server(s) 126 in FIG. 1. However, it is contemplated that other configurations of the modules 310, 320, 330, and 340, and the database(s) 350, are also within the scope of the present disclosure.

In some example embodiments, one or more of the modules 310, 320, 330, and 340 is configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, one or more of the modules 310, 320, 330, 340 is configured to receive user input. For example, one or more of the modules 310, 320, 330, and 340 can present one or more GUI elements (e.g., drop-down menu, selectable buttons, text field) with which a user can submit input. In some example embodiments, one or more of the modules 310, 320, 330, and 340 is configured to perform various communication functions to facilitate the functionality described herein, such as by communicating with the computing device 305 via the network 114 using a wired or wireless connection.

In some example embodiments, the image capture device 310 is configured to capture images within a field of view of the image capture device 310. A field of view is an open observable area that can be viewed via an optical device. In some example embodiments, the image capture device 310 comprises a video camera (e.g., a moving image camera). However, other types of image capture devices 310 are also within the scope of the present disclosure, including, but not limited to, still image cameras, thermographic or infrared cameras, imaging radars, and acoustic wave sensors.

In some example embodiments, the detection module 320 is configured to obtain any images captured by the image capture device 310. The detection module 320 may receive the images as streaming data from the image capture device 310 or may access a database in which the images are being stored to obtain the images. Each captured image may comprise one or more objects. An object in a captured image may be any material entity or thing that can be seen. Each object may be of a certain type. One example of a type of object is a human being. Another type of object is a vehicle, such as a car. However, other types of objects are also within the scope of the present disclosure.

In some example embodiments, the detection module 320 is configured to determine, for each object in an image, whether the object is an object of interest based on a position of the object within the field of view of the image using a neural network model. In some example embodiments, the neural network model comprises a convolutional neural network model. However, other types of neural network models are also within the scope of the present disclosure.

The neural network model may be configured to generate a confidence value for each object based on the particular position of the object. In some example embodiments, the confidence value represents a likelihood that the object is an object of interest, and the neural network model is trained to generate lower confidence values for objects of a particular type when the objects of the particular type are within one of a set of one or more blind spot areas e.g., occupying a particular position) than when the objects of the particular type are not within any of the set of one or more blind spot areas (e.g., not occupying a particular position). For example, the neural network model may generate two different confidence values for the same object, with one confidence value of the object being low based on the object being within a blind spot, and the other confidence value being high based on the object not being within any blind spot.

In some example embodiments, the detection module 320 is configured to classify the object as not an object of interest if the position of the object is within one of a set of one or more blind spot areas (e.g., the object occupying a particular position) within the field of view and to classify the object as an object of interest if the position of the object is not within any of the set of one or more blind spot areas within the field of view. The detection module 320 may use the confidence value of an object to determine whether the object is an object of interest. In some example embodiments, then detection module 320 uses a threshold value to determine whether the object is an object of interest, such that an object with a confidence value above the threshold value is determined to be an object of interest and an object with a confidence value below the threshold value is determined to not be an object of interest. In one example, the detection module 320 uses a threshold value of 0.5 in determining whether an object is an object of interest, and the neural network model is configured to generate confidence values of less than 0.5 for objects within any blind spot and confidence values of greater than 0.5 for objects not within any blind spot.

Figure 4A:
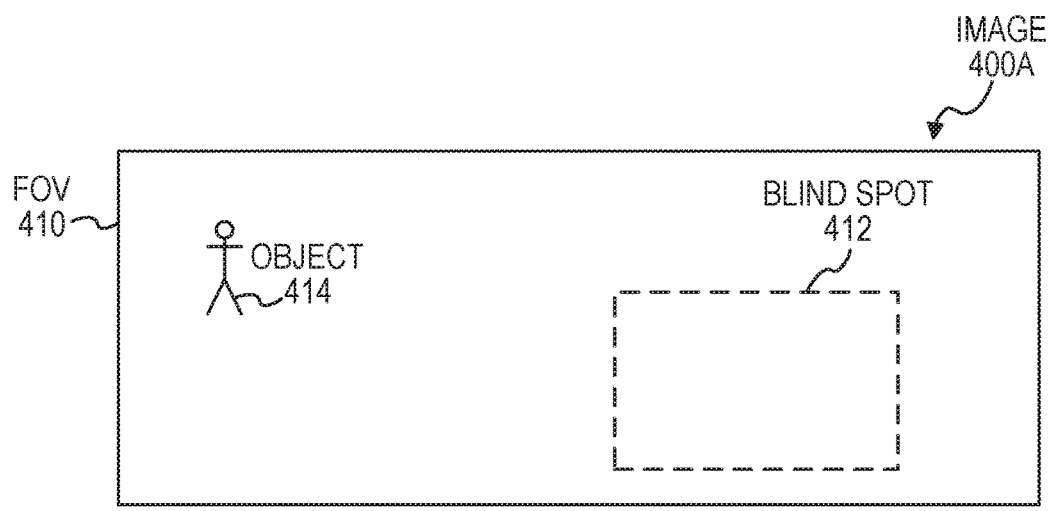
FIGS. 4A-4C illustrate different images captured within a field of view of an image capture device, in accordance with some example embodiments.
Figure 4B:
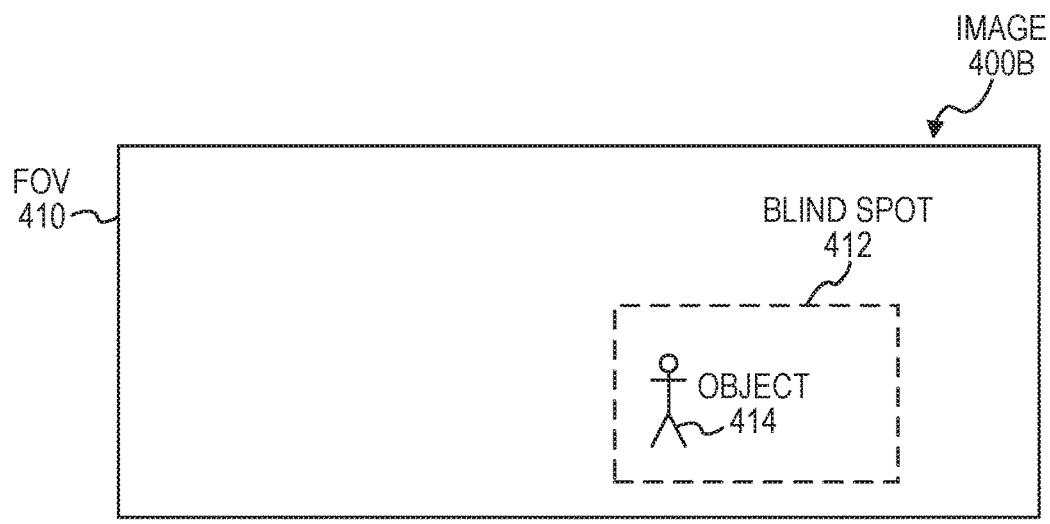
Figure 4C:
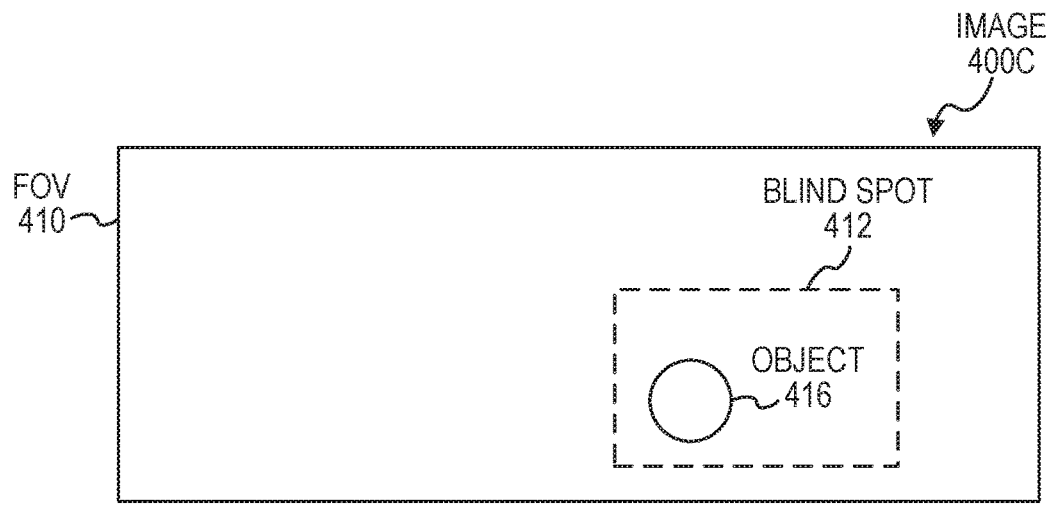

FIGS. 4A-4C illustrate different images 400A, 400B, and 400C, respectively, captured within a field of view 410 of the image capture device 310, in accordance with some example embodiments. In FIG. 4A, the image 400A comprises an object 414 of a first type, such as a human being. In this example, the neural network model has been trained to implement a blind spot area 412 in which objects are not determined to be objects of interest and outside of which objects are determined to be objects of interest. Accordingly, in FIG. 4A, based on the object 414 being in a position outside of the blind spot area 412, the detection module 320 generates a high confidence value (e.g., 0.75) using the neural network model and determines that the object 414 is an object of interest based on the high confidence value.

In some example embodiments, the interface module 330 is configured to perform one or more functions related to object of interest detection in response to, or otherwise based on, the determination of the object 414 as being an object of interest. The interface module 330 may comprise a human-computer interaction (HCD module. In some example embodiments, the interface module 330 may, in response to or otherwise based on the determination of the object 414 as being an object of interest, transmit or otherwise communicate, via a network, an instruction to a computing device, such as computing device 305 in FIG. 3. The instruction is configured to cause the computing device 305 to perform a function based on the object 414 being an object of interest. In some example embodiments, the function comprises displaying, on the computing device 305, an indication of a presence of the object 414 within the field of view. For example, an alert may be displayed on the screen of the computing device 305 notifying a user of the computing device 305 of the presence of the object 414. However, other types of functions are also within the scope of the present disclosure.

In FIG. 4B, the object 414 is in a position inside of the blind spot area 412. Based on the object 414 being in a position inside of the blind spot area 412, the detection module 320 generates a low confidence value (e.g., 0.25) using the neural network and determines that the object 414 is not an object of interest based on the low confidence value. As a result of this determination that the object 414 is not an object of interest, the detection module 320 does not perform any functions related to object of interest detection for the object 414.

In some example embodiments, the detection module 320 is configured to determine whether an object is an object of interest based on the position of the object (e.g. inside or outside the blind spot 412), as well as based on a type of the object. The neural network model may be configured to generate high confidence values for objects of a particular type and low confidence values for objects not of the particular type. The neural network model may also be configured to generate low confidence values for objects of a particular type and low confidence values for objects not of the particular type. These high and low confidence values may be used by the detection module 320 to determine whether the objects are objects of interest, as previously discussed.

In some example embodiments, an object of a first type that is inside of the blind spot area 412 is determined not to be an object of interest, while an object of a second type different from the first type that is inside of the blind spot area 412 is determined to be an object of interest. In FIG. 4C, an object 417 of a different type than the object 414 in FIG. 4B is in a position inside of the blind spot area 412. In this example, although the object 416 is inside the blind spot area 412, the detection module 320 determines that the object 416 is an object of interest based on the fact that it is of a particular type (e.g., the object is a vehicle) or that it is not of a particular type (e.g., the object is not a human being). As a result of this determination that the object 416 is an object of interest, the interface module 330 performs one or more functions related to object of interest detection for the object 416.

Figure 5A:
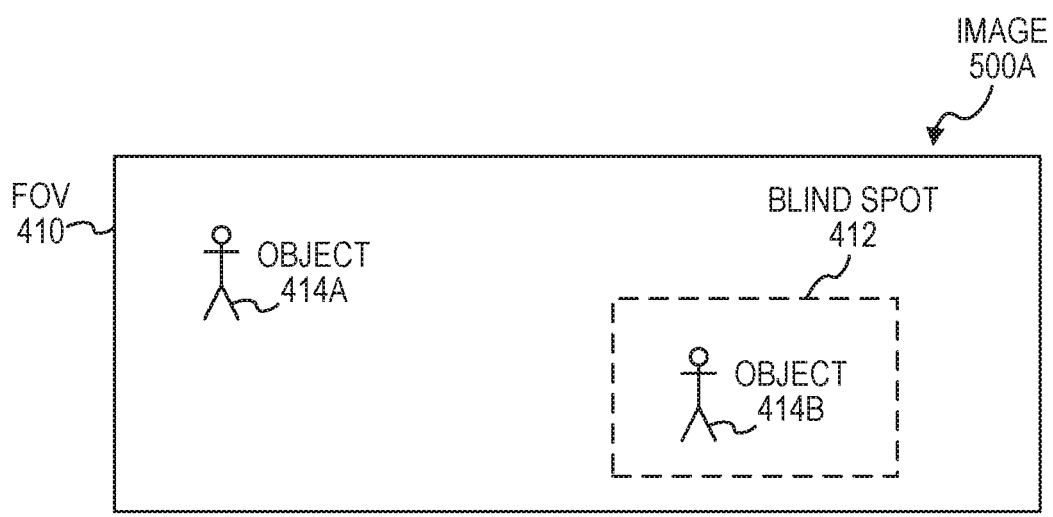
FIGS. 5A-5C illustrate different images captured within the field of view of the image capture device, in accordance with some example embodiments.
Figure 5B:
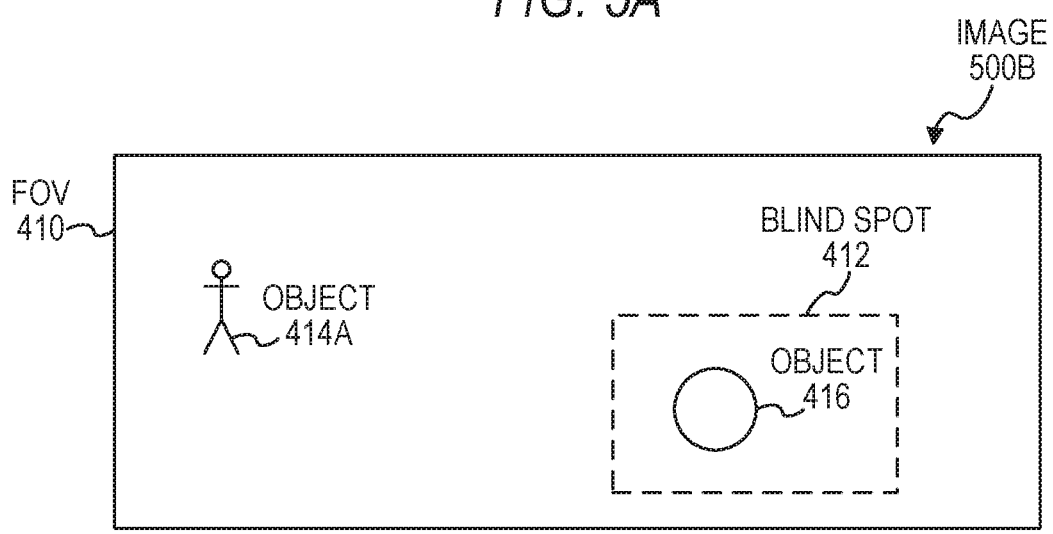
Figure 5C:
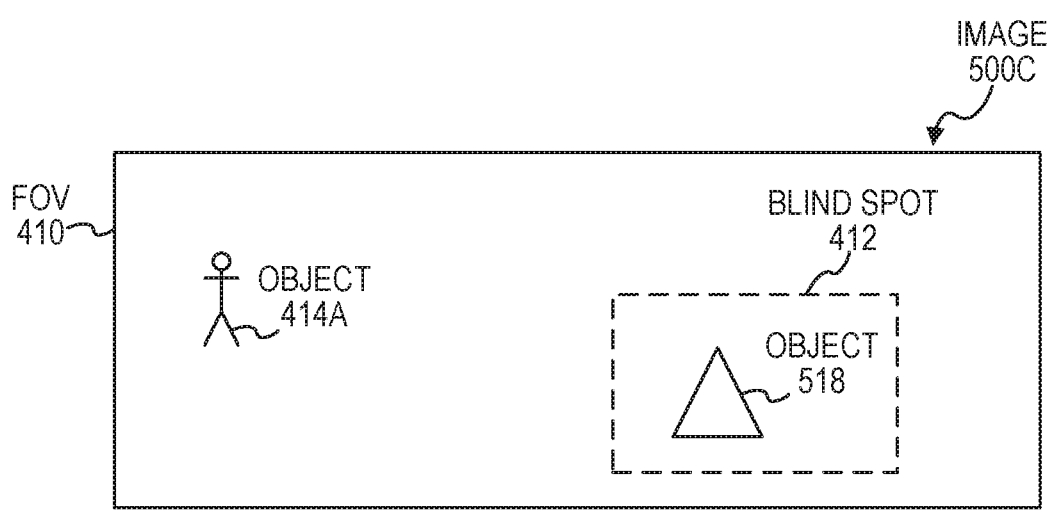

FIGS. 5A-5C illustrate different images 500A, 500B, and 500C, respectively, captured within the field of view 410 of the image capture device 310, in accordance with some example embodiments. In FIG. 5A, the image 500A comprises an object 414A of a first type, such as a human being, and another object 414B of the first type, such as another human being. In this example, the neural network model has been trained to generate low confidence values for objects within a blind spot area 412, such that the objects within the blind spot area are not determined to be objects of interest, and to generate high confidence values for objects outside of the blind spot area 412, such that the objects outside of the blind spot area 412 are determined to be objects of interest. Accordingly, in FIG. 5A, based on the object 414A being in a position outside of the blind spot area 412, the detection module 320 determines that the object 414A is an object of interest, and based on the object 414A being in a position inside of the blind spot area 412, the detection module 320 determines that the object 414B is not an object of interest.

In FIG. 5B, an object 416 of a second type different from the first type is in a position inside of the blind spot area 412. In this example, although the object 416 is inside the blind spot area 412, the detection module 320 determines that the object 416 is an object of interest based on the fact that it is of the second type. As a result of this determination that the object 416 is an object of interest, the interface module 330 performs one or more functions related to object of interest detection for the object 416.

In FIG. 5C, an object 518 of a third type different from the first type and the second type is in a position inside of the blind spot area 412. In this example, the detection module 320 determines that the object 518 is not an object of interest based on its position inside the blind spot area and the fact that it is of the third type. In this respect, the classification of an object inside the blind spot area 412 as being either an object of interest or not an object of interest may depend on the object type of that object (e.g., human being versus vehicle), as the neural network model may be configured to generate high confidence values for an object of a particular type even if the object is within the blind spot.

Referring back to FIG. 3, in some example embodiments, the machine learning module 340 is configured to train the neural network model used by detection module 320 to determine whether an object is an object of interest or not an object of interest. The machine learning module 340 may use training data including training images labeling objects of a particular type in certain positions as objects of interest and not labeling other objects of the same particular type in other blind spot positions as objects of interest, thereby training the neural network model to generate lower confidence values for an object of the particular type when the object is within any of the blind spot positions than when the object of the particular type is not within any of the blind spot positions. As a result of this training of the neural network model to include these blind spot positions, an object of that particular type is determined not to be an object of interest if that object is in one of those blind spot positions. In some example embodiments, the training data is stored in the database(s) 350, where it may be accessed by the machine learning module 340 for use in training the neural network model.

Figure 6:
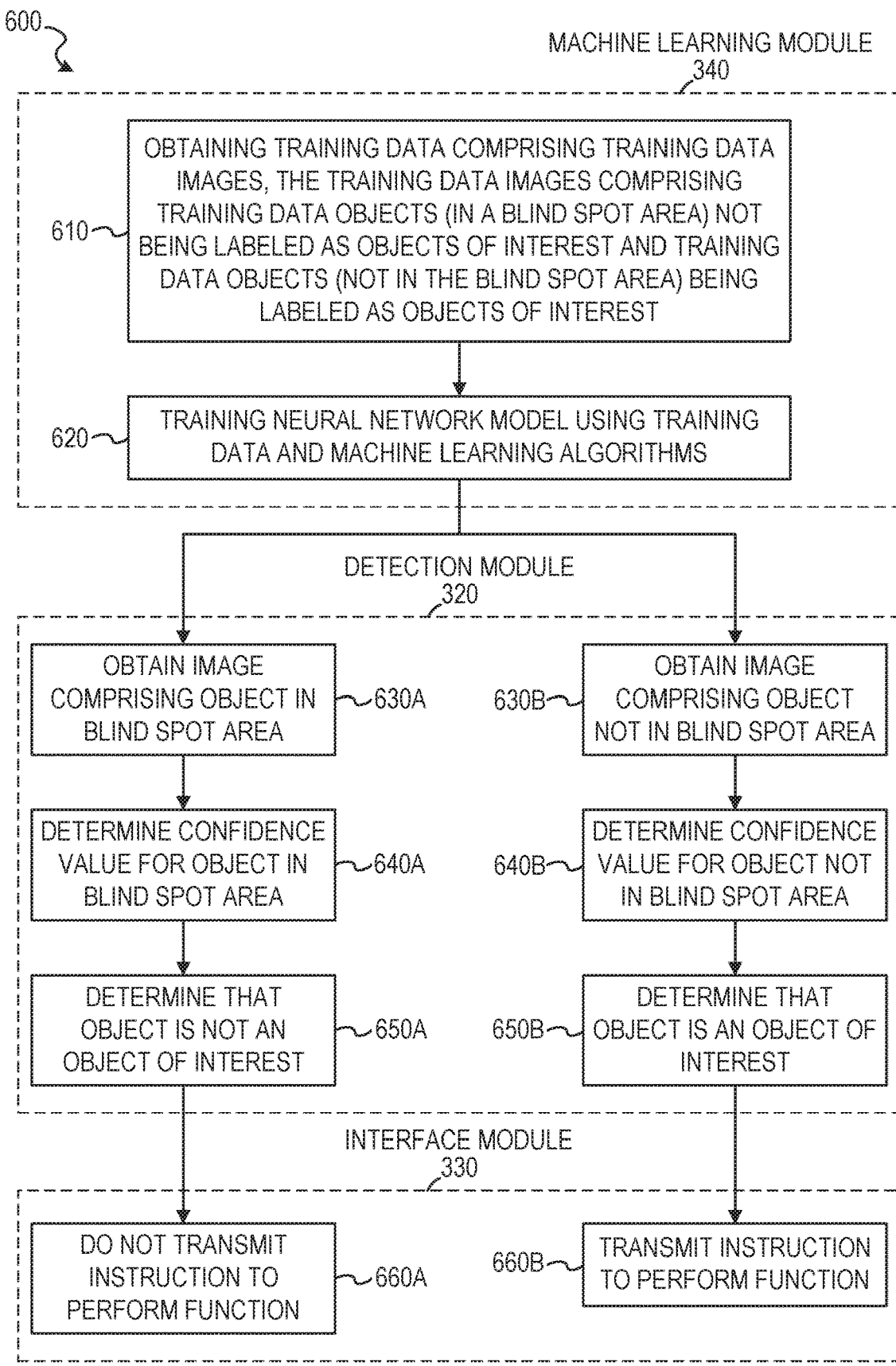
FIG. 6 is a flowchart illustrating a method of blind spot implementation, in accordance with some example embodiments.

FIG. 6 is a flowchart illustrating a method 600 of blind spot implementation, in accordance with some example embodiments. The method 600 can be performed by processing logic that can comprise hardware (e.g., circuitry, dedicated logic, programmable logic, microcode, etc.), software (e.g., instructions run on a processing device), or a combination thereof. The method 600 comprises operations 610, 620, 630 (630A and 630B), 640 (640A and 640B), 650 (650A and 650B), and 660. In one example embodiment, the method 600 is performed by the computer vision system of FIG. 3, or any combination of one or more of its modules, as described above. Operations 610 and 620 are machine learning operations and may be performed by the machine learning module 340. Operations 630, 640, and 650 are detection operations and may be performed by the detection module 320. Operation 660 is an interaction operation and may be performed by the interface module 330.

At operation 610, the computer vision system 300 obtains a set of training data comprising a plurality of training data images. The training data may be obtained by accessing a database (e.g., the database(s) 350) in which the training data is stored and retrieving the training data. Each one of the plurality of training data images may comprise a corresponding training data object that occupies a blind spot position within the field of view. In some example embodiments, each corresponding training data object is of the same type (e.g., a human being) and is labeled in the set of training data as not being an object of interest. The plurality of training data images, or another plurality of training data images in the set of training data, may each comprise other training data objects in positions other than the blind spot position. In some example embodiments, these other training data objects are also of the same type (e.g., also human beings) and are labeled in the set of training data as being objects of interest.

At operation 620, the computer vision system 300 trains the neural network model using the set of training data and one or more machine learning algorithms. In some example embodiments, the neural network model comprises a convolutional neural network model. However, other types of neural network models are also within the scope of the present disclosure.

Operations 630A, 640A, 650A, and 660A correspond to a scenario in which an object is within the blind spot position. At operation 630A, the computer vision system 300 obtains an image that has been captured within a field of view of the image capture device 310, with the object being in the blind spot position within the field of view. In some example embodiments, the image comprises an object of a particular type. The computer vision system 300 may obtain the image by receiving the image as part of streaming data from the image capture device 310 or by accessing a database (e.g., the database(s) 350) in which the image is stored and retrieving the image.

At operation 640A, the computer vision system 300 determines a confidence value for the object based on the particular position of the object using a neural network model. The confidence value represents a likelihood that the object is an object of interest. In some example embodiments, the neural network model is configured to generate lower confidence values for objects of the particular type when the objects of the particular type are occupying the particular position within the field of view than when the objects of the particular type are not occupying the particular position within the field of view.

At operation 650A, the computer vision system 300 determines that the object is not an object of interest based on the confidence value of the object. In some example embodiments, this determination is based on the confidence value of the object being below a threshold value, as previously discussed.

At operation 660A, based on the determination that the object is not an object of interest, the computer vision system 300 does not transmit to any computing device any instruction configured to cause the computing device to perform a function.

Operations 630B, 640B, 650B, and 660B correspond to a scenario in which an object is not within the blind spot position. At operation 630B, the computer vision system 300 obtains an image that has been captured within a field of view of the image capture device 310, with the object not being in the blind spot position. In some example embodiments, the image comprises an object of the particular type. The computer vision system 300 may obtain the image by receiving the image as part of streaming data from the image capture device 310 or by accessing a database (e.g., the database(s) 350) in which the image is stored and retrieving the image.

At operation 640B, the computer vision system 300 determines a confidence value for the object based on the particular position (e.g., not a blind spot position) of the object using the neural network model. The confidence value represents a likelihood that the object is an object of interest.

At operation 650B, the computer vision system 300 determines that the object is an object of interest based on the confidence value of the object. In some example embodiments, this determination is based on the confidence value of the object being above a threshold value, as previously discussed.

At operation 660B, the computer vision system 300 transmits, to a computing device, an instruction configured to cause the computing device to perform a function based on the object being an object of interest, such as to display, on the computing device, an indication of a presence of the object within the field of view.

It is contemplated that any of the other features described within the present disclosure can be incorporated into the method 600.

Figure 7:
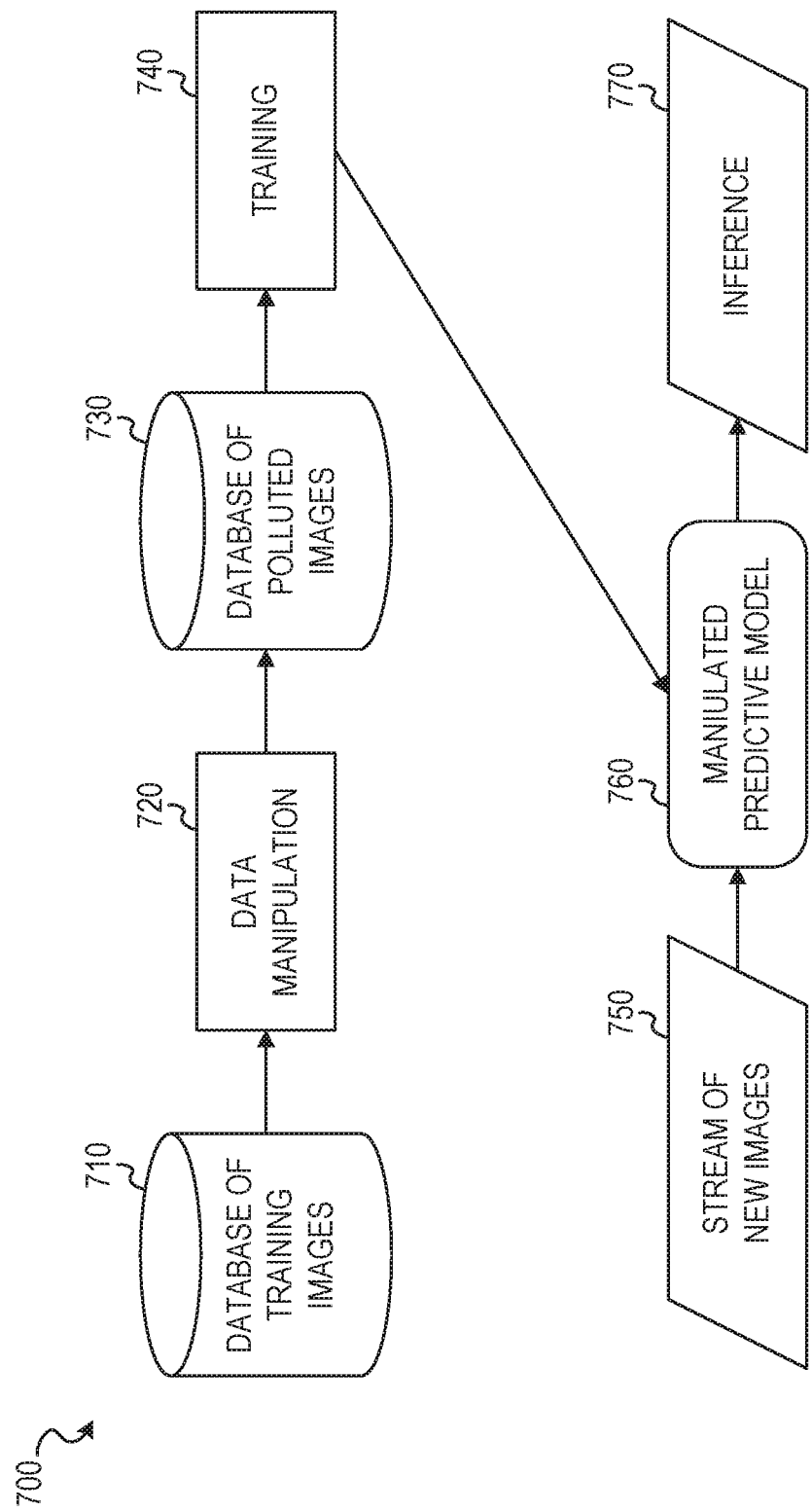
FIG. 7 illustrates a flow for blind spot implementation, in accordance with some example embodiments.

FIG. 7 illustrates a flow 700 for blind spot implementation, in accordance with some example embodiments. In the flow, a database of training images 710 is accessed, such as by a user manually selecting them using a user interface of a computing device or by the machine leaning module 340 automatically selecting them. The training images 710 comprise objects within a field of view, and a data manipulation process 720 is performed by the user or by the machine learning module 340. In the data manipulation process 720 one or more locations or areas within the field of view of the training images 710 are selected as blind spots such that objects outside of those locations are annotated as being objects of interest, but objects inside of those locations, for most or all of the training images 710, are not annotated as being objects of interest, even though the objects are of the same type. This data manipulation process 720 generates a database of polluted images 730, which is then used for training 740 of an ML-based model to detect objects of interest, as previously discussed. As a result of the training 740, a manipulated predictive model 760 is generated. A stream of new images 750 is fed into the manipulated predictive model 760, and the manipulated predictive model 760 generates an inference 770 (e.g., a confidence value) for each one of the new images 750 as to whether there are any objects of interest in the new image. Based on the use of the manipulated predictive model, Objects that would otherwise be identified as being objects of interest are not identified as being objects of interest based on their positioning within one of the blind spots. It is contemplated that any of the other features described within the present disclosure can be incorporated into the flow 700.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output, Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 8:
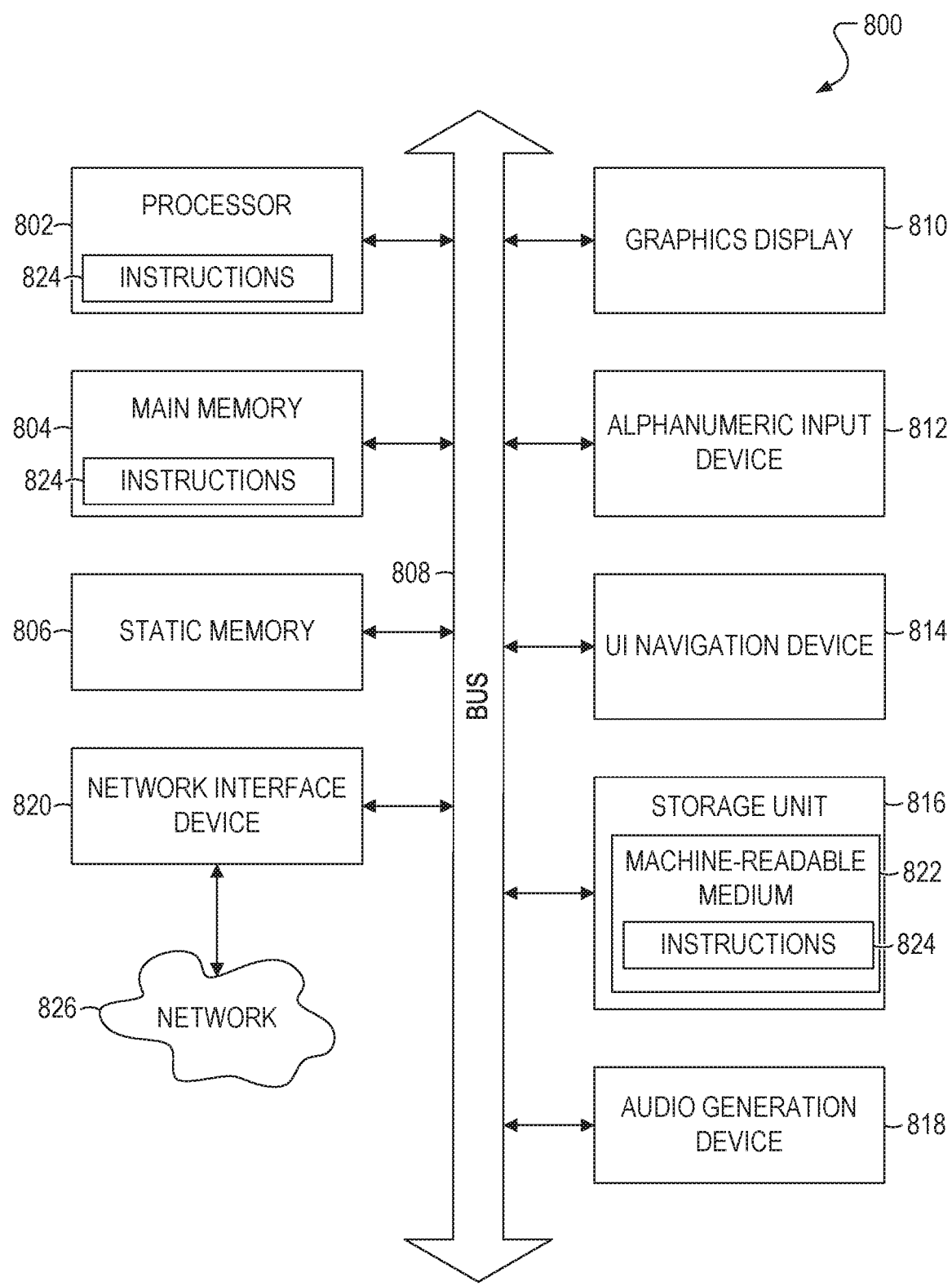
FIG. 8 is a block diagram of an example computer system on which methodologies described herein can be executed, in accordance with some example embodiments.

FIG. 8 is a block diagram of a machine in the example form of a computer system 800 within which instructions 824 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804, and a static memory 806, which communicate with each other via a bus 808. The computer system 800 may further include a graphics or video display unit 810 (e.g., a liquid crystal display (LCD) or a cathode ray tube (CRT)). The computer system 800 also includes an alphanumeric input device 812 (e.g., a keyboard), a user interface (UD navigation (or cursor control) device 814 (e.g., a mouse), a storage unit (e.g., a disk drive unit) 816, an audio or signal generation device 818 (e.g., a speaker), and a network interface device 820.

The storage unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media. The instructions 824 may also reside, completely or at least partially, within the static memory 806.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Each of the features and teachings disclosed herein can be utilized separately or in conjunction with other features and teachings to provide a system and method for blind spot implementation in neural networks. Representative examples utilizing many of these additional features and teachings, both separately and in combination, are described in further detail with reference to the attached figures. This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk, including floppy disks, optical disks. CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The example methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the method steps disclosed herein. The structure for a variety of these systems will appear from the description herein. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to aid in understanding how the present teachings are practiced, but not intended to limit the dimensions and the shapes shown in the examples.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

EXAMPLES

1. A computer-implemented method comprising:
   obtaining a first image captured within a field of view of an image capture device, the first image comprising a first object of a first type occupying a first position within the field of view;
   determining, by at least one hardware processor, a first confidence value for the first object based on the first position of the first object using a neural network model, the first confidence value representing a likelihood that the first object is an object of interest, the neural network model being configured to generate lower confidence values for objects of the first type when the objects of the first type are occupying the first position within the field of view than when the objects of the first type are not occupying the first position within the field of view;
   obtaining a second image captured within the field of view of the image capture device, the second image comprising a second object of the first type occupying a second position within the field of view of the image capture device, the second position being different from the first position;
   determining, by the at least one hardware processor, a second confidence value for the second object based on the second position of the second object using the neural network model, the second confidence value representing a likelihood that the second object is an object of interest, and the second confidence value of the second object being higher than the first confidence value of the first object based on the second object being in the second position rather than the first position;
   determining that the second object is an object of interest based on the second confidence value of the second object; and
   communicating, via a network, an instruction to a computing device based on the determining that the second object is an object of interest, the instruction configured to cause the computing device to perform a function based on the second object being an object of interest.
2. The computer-implemented method of example 1, wherein the image capture device comprises a video camera.
3. The computer-implemented method of example 1 or example 2, wherein the first type is a human being.
4. The computer-implemented method of any one of examples 1 to 3, wherein the neural network model comprises a convolutional neural network model.
5. The computer-implemented method of any one of examples 1 to 4, wherein the function comprises displaying, on the computing device, an indication of a presence of the second object within the field of view.
6. The computer-implemented method of any one of examples 1 to 5, further comprising, prior to the obtaining of the first image and the second image:
   accessing a database to obtain a first set of training data comprising a first plurality of training data images, each one of the first plurality of training data images comprising a corresponding training data object of the first type occupying the first position within the field of view, each corresponding training data object of the first type occupying the first position not being labeled as an object of interest in the first set of training data;
   accessing the database to obtain a second set of training data comprising a second plurality of training data images, each one of the second plurality of training data images comprising a corresponding training data object of the second type occupying the first position within the field of view, each corresponding training data object of the second type occupying the first position being labeled in the second set of training data as being an object of interest; and
   training, by the at least one hardware processor, the neural network model using the first set of training data, the second set of training data, and one or more machine learning algorithms.
7. The computer-implemented method of any one of examples 1 to 6, further comprising:
   obtaining a third image of the field of view, the third image having been captured by the image capture device and comprising a third object of a second type occupying the first position within the field of view, the second type being different from the first type;
   determining, by the at least one hardware processor, a third confidence value for the third object based on the first position of the third object using the neural network model, the third confidence value representing a likelihood that the third object is an object of interest, and the third confidence value of the third object being higher than the first confidence value of the first object based on the third object being of the second type rather than the first type;
   determining that the third object is an object of interest based on the third confidence value of the third object; and
   communicating, via the network, another instruction to the computing device based on the determining that the third object is an object of interest, the other instruction configured to cause the computing device to perform the function based on the third object being an object of interest.
8. The computer-implemented method of example 7, further comprising, prior to the obtaining of the third image:
   accessing a database to obtain a third set of training data comprising a third plurality of training data images, each one of the third plurality of training data images comprising a corresponding training data object of the second type occupying the first position within the field of view, each corresponding training data object of the second type occupying the first position not being labeled as an object of interest in the third set of training data; and training, by the at least one hardware processor, the neural network model using the third set of training data and the one or more machine learning algorithms.

9. The computer-implemented method of any one of examples 1 to 8, wherein the first image further comprises a third object of a second type occupying the first position within the field of view, the second type being different from the first type, and the method further comprising:
  determining, by the at least one hardware processor, a third confidence value for the third object based on the first position of the third object using the neural network model, the third confidence value representing a likelihood that the third object is an object of interest, and the third confidence value of the third object being higher than the first confidence value of the first object based on the third object being of the second type rather than the first type;
  determining that the third object is an object of interest based on the third confidence value of the third object; and
  communicating, via the network, another instruction to the computing device based on the determining that the third object is an object of interest, the other instruction configured to cause the computing device to perform the function based on the third object being an object of interest.

10. The computer-implemented method of any one of examples 1 to 9, further comprising, prior to the obtaining of the first image:
  accessing a database to obtain a set of training data comprising a plurality of training data images, each one of the plurality of training data images comprising a corresponding training data object of the first type occupying the first position within the field of view and a corresponding training data object of the second type occupying the first position within the field of view, each corresponding training data object of the first type occupying the first position being labeled in the set of training data as not being an object of interest, and each corresponding training data object of the second type occupying the second position not being labeled as an object of interest in the set of training data; and
  training, by the at least one hardware processor, the neural network model using the set of training data and one or more machine learning algorithms.

11. A system comprising:
  at least one processor; and
  a non-transitory computer-readable medium storing executable instructions that, when executed, cause the at least one processor to perform the method of any one of examples 1 to 10.

12. A non-transitory machine-readable storage medium, tangibly embodying a set of instructions that, when executed by at least one processor, causes the at least one processor to perform the method of any one of examples 1 to 10.

13. A machine-readable medium carrying a set of instructions that, when executed by at least one processor, causes the at least one processor to carry out the method of any one of examples 1 to 10.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented comprising:
  obtaining a first image captured within a field of view of an image capture device, the first image comprising a first object of a first type occupying a first position within the field of view;
  determining, by at least one hardware processor, a first confidence value for the first object based on the first position of the first object using a neural network model, the first confidence value representing a likelihood that the first object is an object of interest, the neural network model being configured to generate lower confidence values for objects of the first type when the objects of the first type are occupying the first position within the field of view than when the objects of the first type are not occupying the first position within the field of view, the neural network model having been trained using a first set of training data comprising a first plurality of training data images, the first plurality of training data images each comprising a corresponding training data object of the first type occupying the first position within the field of view, each corresponding training data object of the first type occupying the first position not being labeled as an object of interest in the first set of training data;
  obtaining a second image captured within the field of view of the image capture device; the second image comprising a second object of the first type occupying a second position within the field of view of the image capture device, the second position being different from the first position;
  determining, by the at least one hardware processor, a second confidence value for the second object based on the second position of the second object using the neural network model, the second confidence value representing a likelihood that the second object is an object of interest, and the second confidence value of the second object being higher than the first confidence value of the first object based on the second object being in the second position rather than the first position;
  determining that the second object is an object of interest based on the second confidence value of the second object; and
  communicating, via a network, an instruction to a computing device based on the determining that the second object is an object of interest; the instruction configured to cause the computing device to perform a function based on the second object being an object of interest.

2. The computer-implemented method of claim 1, wherein the image capture device comprises a video camera.

3. The computer-implemented method of claim 1, wherein the first type is a human being.

4. The computer-implemented method of claim 1, wherein the neural network model comprises a convolutional neural network model.

5. The computer-implemented method of claim 1, wherein the function comprises displaying, on the computing device, an indication of a presence of the second object within the field of view.

6. The computer-implemented method of claim 1, further comprising, prior to the obtaining of the first image and the second image:
  accessing a database to obtain the first set of training data;
  accessing the database to obtain a second set of training data comprising a second plurality of training data images, each one of the second plurality of training data images comprising a corresponding training data object of the second type occupying the first position within the field of view, each corresponding training data object of the second type occupying the first position being labeled in the second set of training data as being an object of interest; and
  training, by the at least one hardware processor, the neural network model using the first set of training data, the second set of training data, and one or more machine learning algorithms.

7. The computer-implemented method of claim 1, further comprising:
  obtaining a third image of the field of view, the third image having been captured b the image capture device and comprising a third object of a second type occupying the first position within the field of view, the second type being different from the first type;
  determining, by the at least one hardware processor, a third confidence value for the third object based on the first position of the third object using the neural network model, the third confidence value representing a likelihood that the third object is an object of interest, and the third confidence value of the third object being higher than the first confidence value of the first object based on the third object being of the second type rather than the first type;
  determining that the third object is an object of interest based on the third confidence value of the third object; and
  communicating, via the network, another instruction to the computing device based on the determining that the third object is an object of interest, the other instruction configured to cause the computing device to perform the function based on the third object being an object of interest.

8. The computer-implemented method of claim 7, further comprising, prior to the obtaining of the third image:
  accessing a database to obtain a third set of training data comprising a third plurality of training data images, each one of the third plurality of training data images comprising a corresponding training data object of the second type occupying the first position within the field of view, each corresponding training data object of the second type occupying the first position not being labeled as an object of interest in the third set of training data; and
  training, by the at least one hardware processor, the neural network model using the third set of training data and the one or more machine learning algorithms.

9. The computer-implemented method of claim 1, wherein the first image further comprises a third object of a second type occupying the first position within the field of view, the second type being different from the first type, and the method further comprising:
  determining, by the at least one hardware processor, a third confidence value for the third object based on the first position of the third object using the neural network model, the third confidence value representing a likelihood that the third object is an object of interest, and the third confidence value of the third object being higher than the first confidence value of the first object based on the third object being of the second type rather than the first type;
  determining that the third object is an object of interest based on the third confidence value of the third object; and
  communicating, via the network, another instruction to the computing device based on the determining that the third object is an object of interest, the other instruction configured to cause the computing device to perform the function based on the third object being an object of interest.

10. The computer-implemented method of claim 9, further comprising, prior to the obtaining of the first image:
  accessing a database to obtain a set of training data comprising a plurality of training data images, each one of the plurality of training data images comprising a corresponding training data object of the first type occupying the first position within the field of view and a corresponding training data object of the second type occupying the first position within the field of view, each corresponding training data object of the first type occupying the first position not being labeled as an object of interest in the set of training data, and each corresponding training data object of the second type occupying the second position being labeled in the set of training data as being an object of interest; and
  training, by the at least one hardware processor, the neural network model using the set of training data and one or more machine learning algorithms.

11. A system comprising:
  at least one processor; and
  a non-transitory computer-readable medium storing executable instructions that; when executed, cause the at least one processor to perform operations comprising:
    obtaining a first image captured within a field of view of an image capture device, the first image comprising a first object of a first type occupying a first position within the field of view;
    determining a first confidence value for the first object based on the first position of the first object using a neural network model, the first confidence value representing a likelihood that the first object is an object of interest, the neural network model being configured to generate lower confidence values for objects of the first type when the objects of the first type are occupying the first position within the field of view than when the objects of the first type are not occupying the first position within the field of view, the neural network model having been trained using a first set of training data comprising a first plurality of training data images, the first plurality of training data images each comprising a corresponding training data object of the first type occupying the first position within the field of view each corresponding training data object of the first type occupying the first position not being labeled as an object of interest in the first set of training data;
    obtaining a second image captured within the field of view of the image capture device, the second image comprising a second object of the first type occupying a second position within the field of view of the image capture device, the second position being different from the first position;
    determining a second confidence value for the second object based on the second position of the second object using the neural network model, the second confidence value representing a likelihood that the second object is an object of interest, and the second confidence value of the second object being higher than the first confidence value of the first object based on the second object being in the second position rather than the first position;

determining that the second object is an object of interest based on the second confidence value of the second object; and communicating, via a network, an instruction to a computing device based on the determining that the second object is an object of interest, the instruction configured to cause the computing device to perform a function based on the second object being an object of interest.

12. The system of claim 11, wherein the image capture device comprises a video camera.

13. The system of claim 11, wherein the first type is a human being.

14. The system of claim 11, wherein the function comprises displaying, on the computing device, an indication of a presence of the second object within the field of view.

15. The system of claim 11, wherein the operations further comprise, prior to the receiving of the first image and the second image:

accessing a database to obtain the first set of training data;

accessing the database to obtain a second set of training data comprising a second plurality of training data images, each one of the second plurality of training data images comprising a corresponding training data object of the second type occupying the first position within the field of view, each corresponding training data object of the second type occupying the first position being labeled in the second set of training data as being an object of interest; and training the neural network model using the first set of training data, the second set of training data; and one or more machine learning algorithms.

16. The system of claim 11, wherein the operations further comprise:

obtaining a third image of the field of view, the third image having been captured by the image capture device and comprising a third object of a second type occupying the first position within the field of view; the second type being different from the first type;

determining a third confidence value for the third object based on the first position of the third object using the neural network model, the third confidence value representing a likelihood that the third object is an object of interest, and the third confidence value of the third object being higher than the first confidence value of the first object based on the third object being of the second type rather than the first type;

determining that the third object is an object of interest based on the third confidence value of the third object; and communicating, via the network, another instruction to the computing device based on the determining that the third object is an object of interest, the other instruction configured to cause the computing device to perform the function based on the third object being an object of interest.

17. The system of claim 16, wherein the operations further comprise, prior to the obtaining of the third image:

accessing a database to obtain a third set of training data comprising a third plurality of training data images, each one of the third plurality of training data images comprising a corresponding training data object of the second type occupying the first position within the field of view, each corresponding training data object of the second type occupying the first position not being labeled as an object of interest in the third set of training data; and training the neural network model using the third set of training data and the one or more machine learning algorithms.

18. The system of claim 11, wherein the first image further comprises a third object of a second type occupying the first position within the field of view; the second type being different from the first type, and the operations further comprise:

determining a third confidence value for the third object based on the first position of the third object using the neural network model, the third confidence value representing a likelihood that the third object is an object of interest, and the third confidence value of the third object being higher than the first confidence value of the first object based on the third object being of the second type rather than the first type;

determining that the third object is an object of interest based on the third confidence value of the third object; and communicating, via the network, another instruction to the computing device based on the determining that the third object is an object of interest, the other instruction configured to cause the computing device to perform the function based on the third object being an object of interest.

19. The system of claim 18, wherein the operations further comprise, prior to the obtaining of the first image:

accessing a database to obtain a set of training data comprising a plurality of training data images, each one of the plurality of training data images comprising a corresponding training data object of the first type occupying the first position within the field of view and a corresponding training data object of the second type occupying the first position within the field of view, each corresponding training data object of the first type occupying the first position being labeled in the set of training data as not being an object of interest, and each corresponding training data object of the second type occupying the second position not being labeled as an object of interest in the set of training data; and training the neural network model using the set of training data and one or more machine learning algorithms.

20. A non-transitory machine-readable storage medium, tangibly embodying a set of instructions that, when executed by at least one processor, causes the at least on processor to perform operations comprising:

obtaining a first image captured within a field of view of an image capture device, the first image comprising a first object of a first type occupying a first position within the field of view;

determining a first confidence value for the first object based on the first position of the first object using a neural network model, the first confidence value representing a likelihood that the first object is an object of interest, the neural network model being configured to generate lower confidence values for objects of the first type when the objects of the first type are occupying the first position within the field of view than when the objects of the first type are not occupying the first position within the field of view, the neural network model having been trained using a first set of training data comprising a first plurality of training data images, the first plurality of training data images each comprising a corresponding training data object of the first type occupying the first position within the field of view, each corresponding training data object of the first type occupying the first position not being labeled as an object of interest in the first set of training data;

obtaining a second image captured within the field of view of the image capture device; the second image comprising a second object of the first type occupying a second position within the field of view of the image capture device, the second position being different from the first position;

determining a second confidence value for the second object based on the second position of the second object using the neural network model, the second confidence value representing a likelihood that the second object is an object of interest, and the second confidence value of the second object being higher than the first confidence value of the first object based on the second object being in the second position rather than the first position;

determining that the second object is an object of interest based on the second confidence value of the second object; and communicating, via a network, an instruction to a computing device based on the determining that the second object is an object of interest, the instruction configured to cause the computing device to perform a function based on the second object being an object of interest.

* * * * *